(No Model.) 5 Sheets—Sheet 3.
H. WILLIAMS & J. L. & L. R. ALBERGER.
MANUFACTURE OF SALT.
No. 351,082. Patented Oct. 19, 1886.
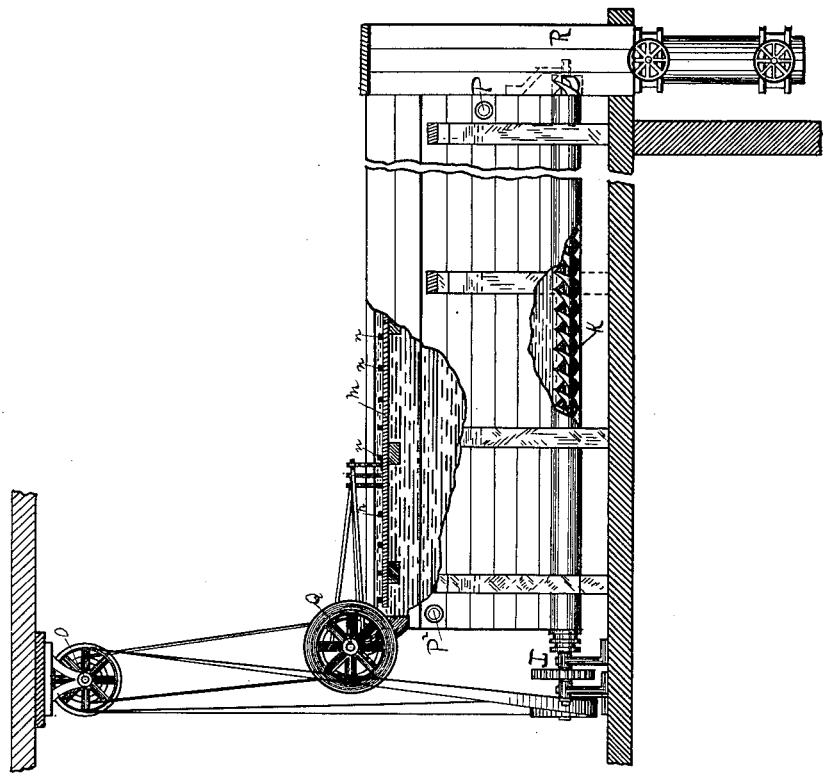
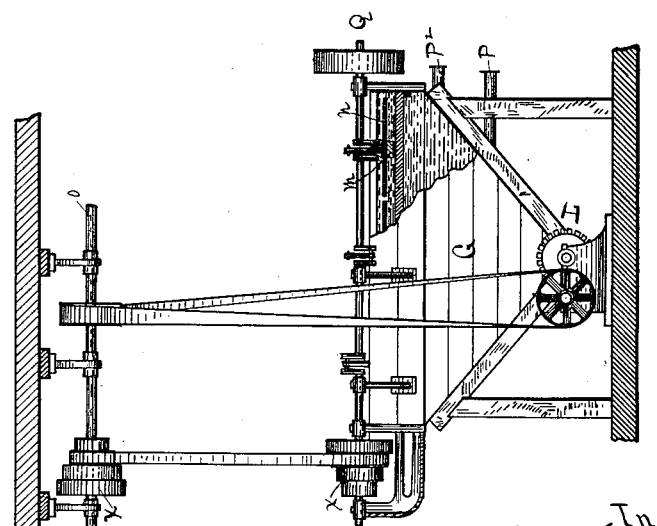
Fig. 3.
Attest:
Christian Sturm
Nicholas Meyers
Inventors:
Horace Williams
John L. Alberger
Louis R. Alberger (No Model.)   5 Sheets—Sheet 4.

H. WILLIAMS & J. L. & L. R. ALBERGER.
MANUFACTURE OF SALT.

No. 351,082.   Patented Oct. 19, 1886.

Attest:
Christian Sturm
Nicholas Meyer

Inventors:
Horace Williams
John L. Alberger
Louis R. Alberger

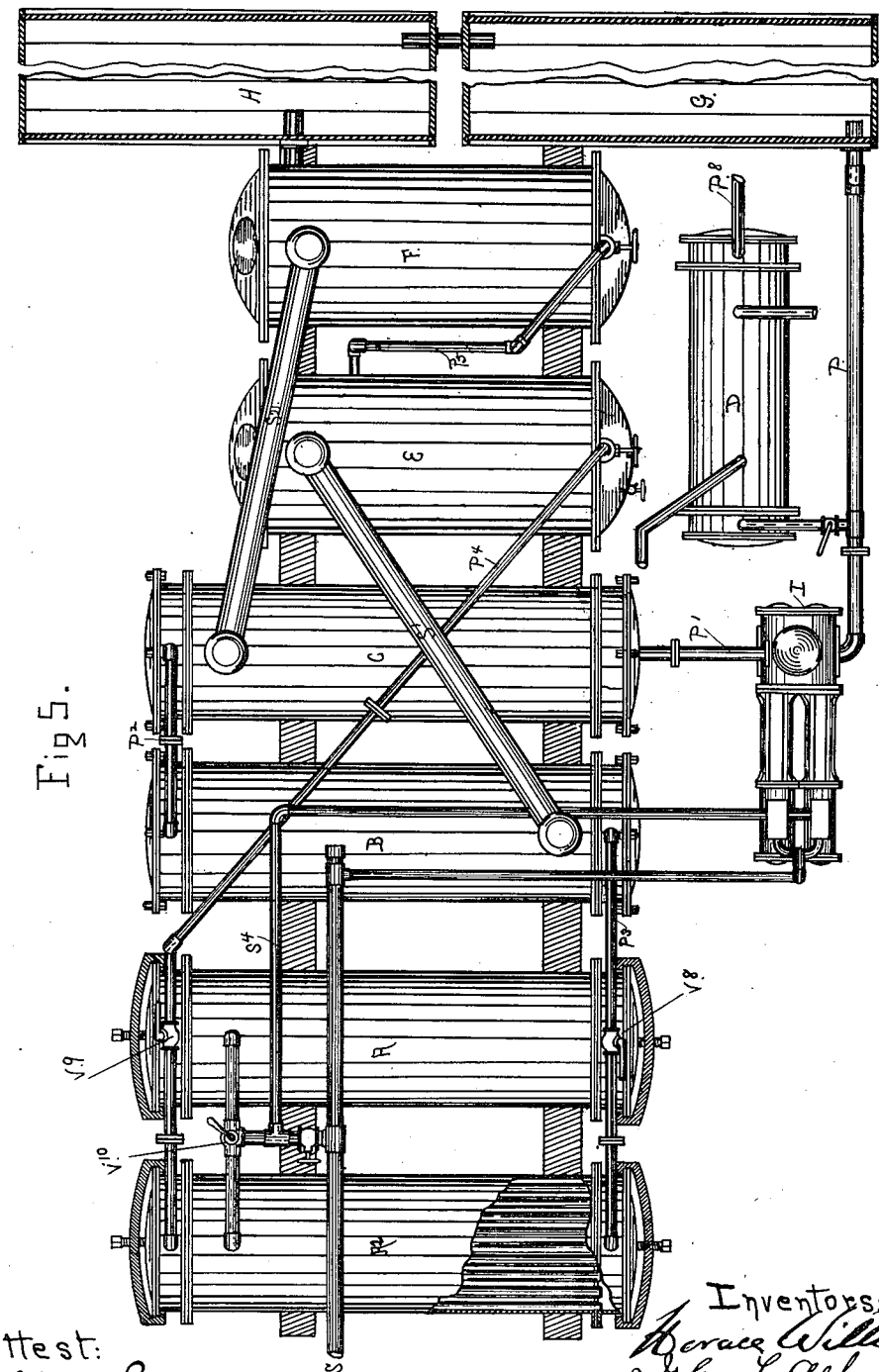

UNITED STATES PATENT OFFICE.

HORACE WILLIAMS, JOHN L. ALBERGER AND LOUIS R. ALBERGER, OF BUFFALO, NEW YORK.

MANUFACTURE OF SALT.

SPECIFICATION forming part of Letters Patent No. 351,082, dated October 19, 1886.

Application filed September 17, 1885. Serial No. 177,375. (No model.)

*To all whom it may concern:*

Be it known that we, HORACE WILLIAMS, JOHN L. ALBERGER, and LOUIS R. ALBERGER, citizens of the United States, residing at Buffalo, Erie county, and State of New York, have invented a new and useful Improvement in the Manufacture of Salt, of which the following is a specification.

This invention relates to the process of making salt from brine and the apparatus used, it being especially adapted to the manufacture of fine salt and to the saving of fuel usually employed.

The methods at present in use for making salt, being well understood by those versed in the art, need not be described here.

The objects of our invention are to utilize the heat in the steam evaporated; to make the process continuous; to extract the impurities in a liquid condition or in a state of crystallization, so they can be easily removed; to make fine salt of any degree of fineness required; to produce an article practically depurated from all impurities. These objects we attain by the use of the apparatus described herein, and shown in the annexed drawings, of which—

Figure 1:
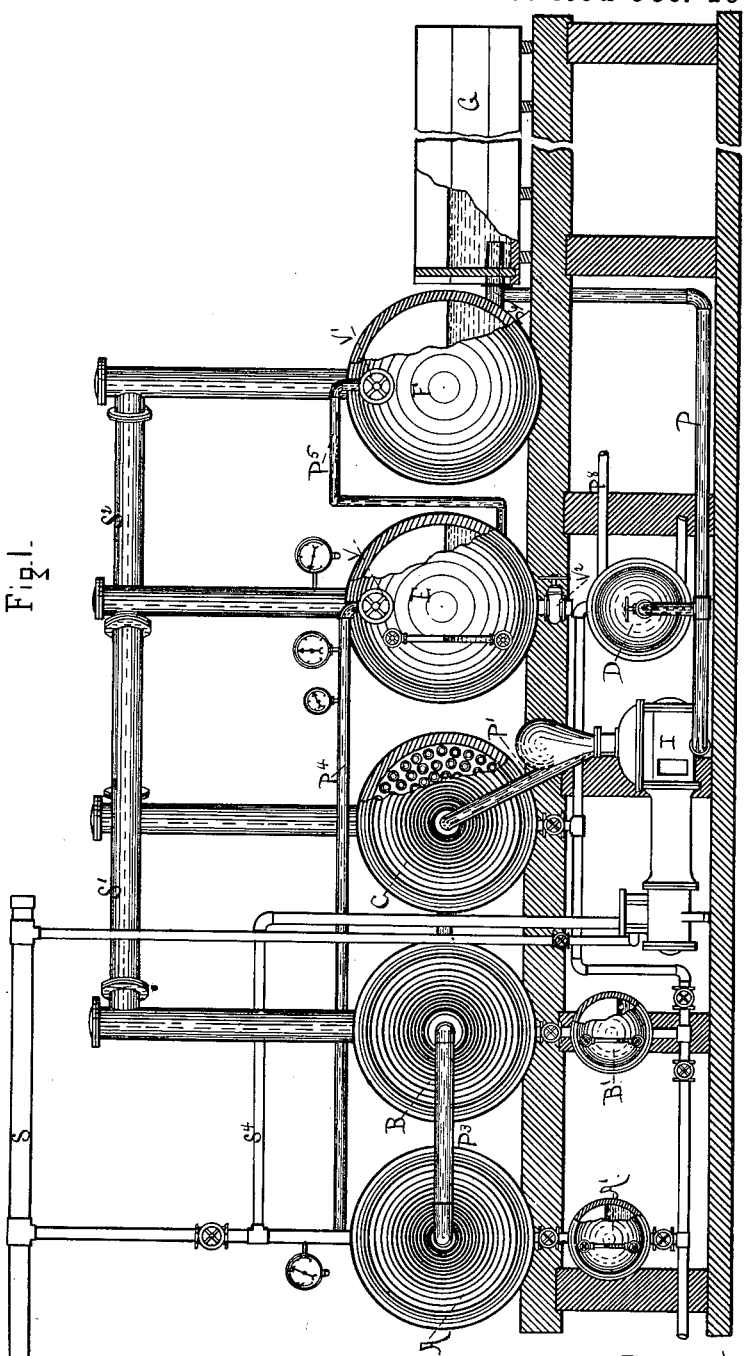
Figure 2:
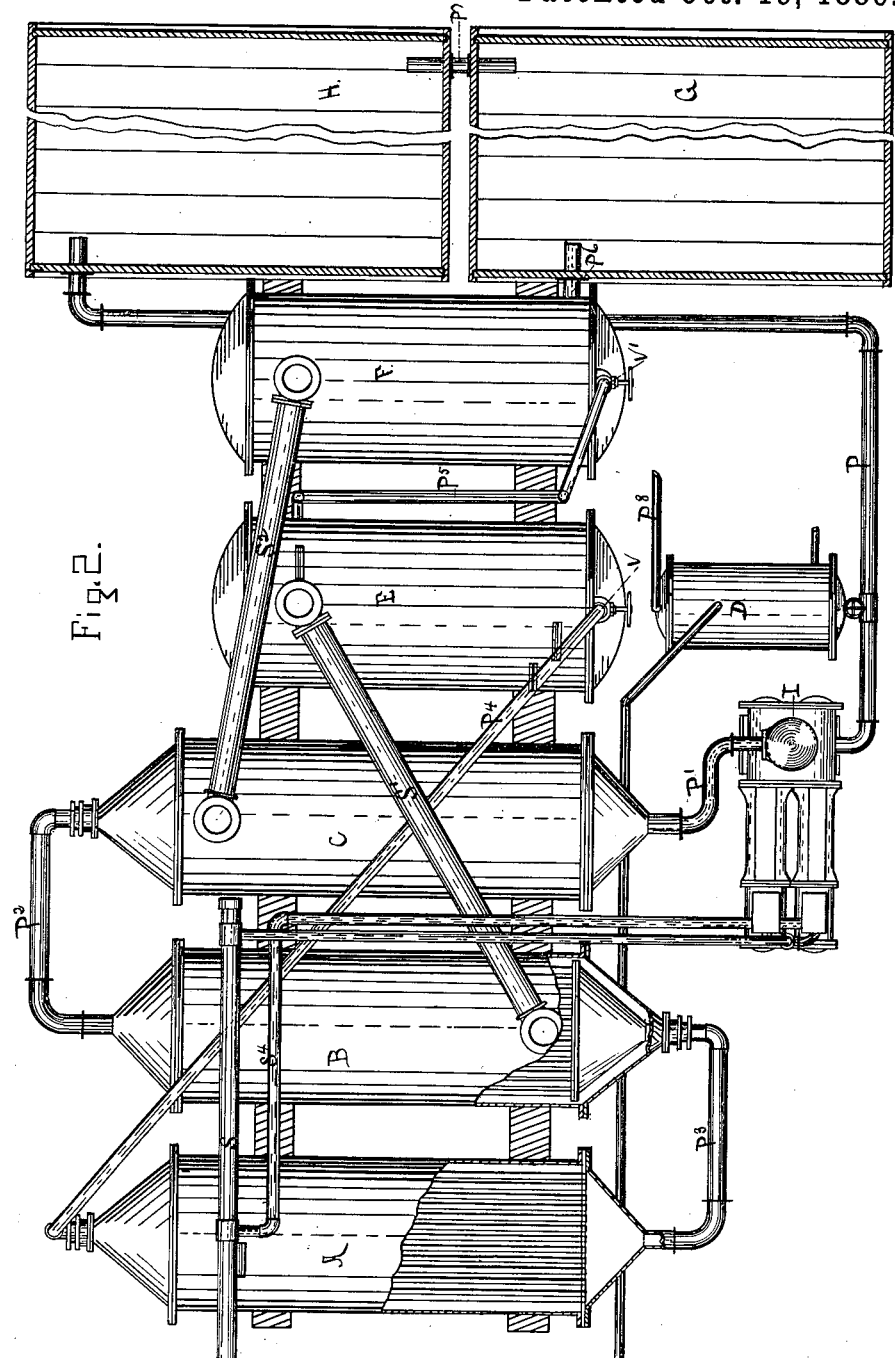
Figure 4:
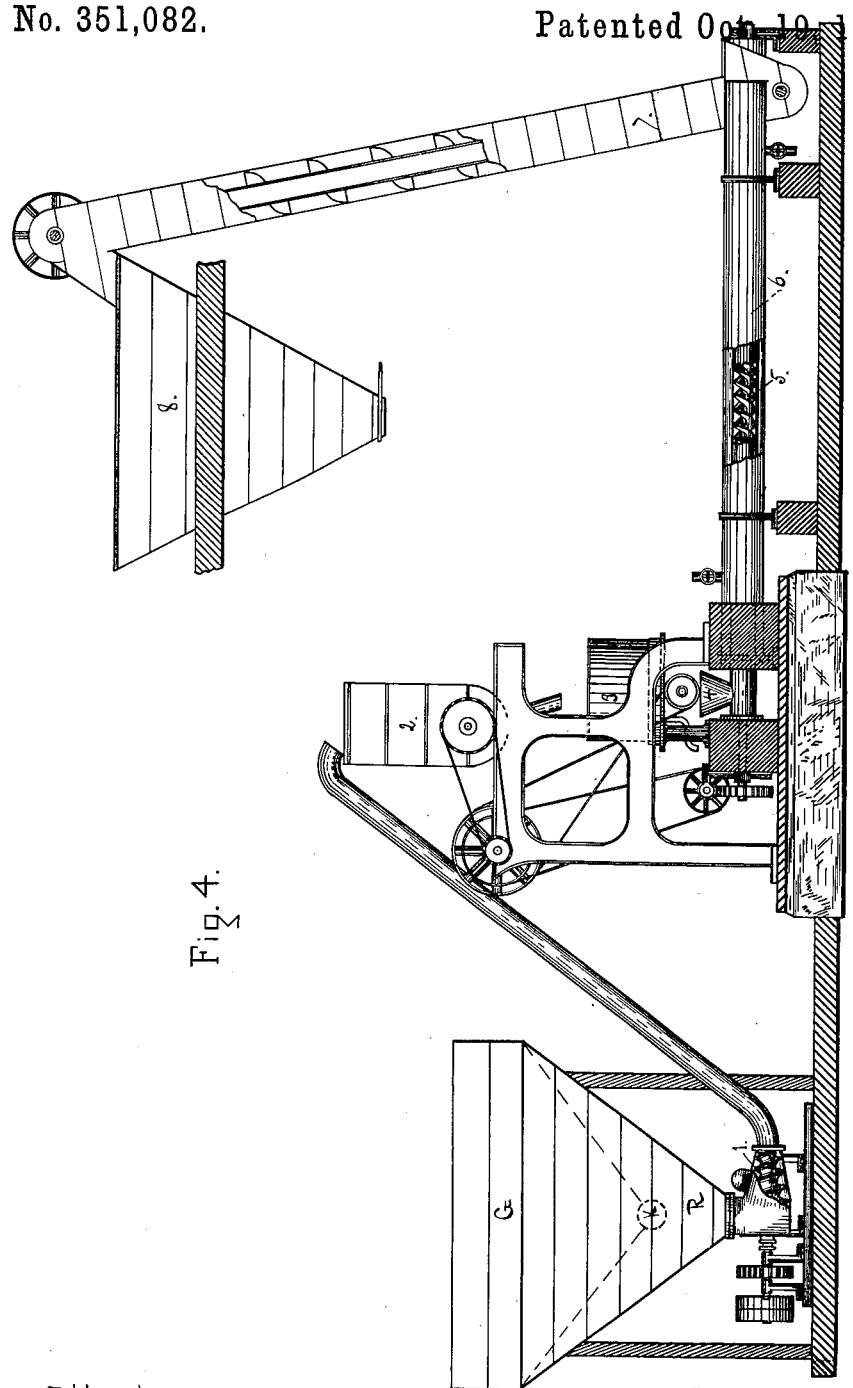

Figure 1 is an elevation, partly in section. Fig. 2 is a plan; Fig. 3, an open evaporator or grainer, with conical bottom, also the apparatus for making fine salt; Fig. 4, details of same. Fig. 5 represents a modification of the apparatus.

Like letters and figures in each refer to like parts.

A, B, and C, Figs. 1 and 2, are cylindrical tubular heaters, in which the steam used for heating and the brine to be heated are brought together. A portion of C is shown removed in Fig. 1; also, a portion of A and B in Fig. 2, showing their construction. They consist of a case inclosing a number of brass tubes firmly secured at each end to a head of brass. One of these heads is secured to an iron case rigidly, while the other head has a conical cover attached to it, connecting by a pipe through a stuffing-box in the end of the conical outside case with the circulatory system. By this arrangement the steam around the tubes heats them, and, being condensed, heats the brine in them. The pipes expand and contract in length and push the conical inside head in or out, thus preventing the rupture of the heater, which would result if provision were not thus made. If the conical heads be made of brass as well as the conducting-pipes, the brine will not touch any other material.

D is a smaller heater, into which water of condensation from B and C is passed around the tubes to heat the incoming supply of fresh brine flowing through them.

A' and B' are hot-wells attached to the heaters A and B, connecting with them by open pipes, so that the condensed-steam water can flow freely into them. From these through a common steam-pump the steam-generators are supplied with very hot water, nearly as hot as the steam in the heater. The steam-pressure on the surface of the water forces the water into the pump suction-chambers, and a proper level is maintained in the hot-well by means of sight-gages, with which they are fitted.

E and F are closed evaporators. The heated brine flows through them continuously, and the steam arising from them is under control and is utilized. These are plain cylindrical vessels, strong enough to carry a moderate pressure, and are connected to the heaters and open grainers by suitable pipes.

G H are open evaporators. They are like the grainers commonly used, except they have no heating-pipes in them. They are connected by suitable pipes with the closed evaporators with the pump I and with each other. In these open grainers all the salt is deposited, and as one-half ($\frac{1}{2}$) the water in the brine is removed by the action in the closed evaporator, they require to be but one-half ($\frac{1}{2}$) the usual size to do the same work, and when used with the fine-grain agitators, which increase the evaporation, less size yet will be required.

I is a pump. A duplex is preferred, as it produces a steadier current. It circulates continuously the brine from the open evaporators, through the heaters and closed evaporators, to the open evaporators again. It is provided with relatively large steam-cylinders, so that with seventy-five pounds steam in the boilers and fifty pounds in the heaters, A,[steam-pressure, it can maintain sixty pounds hydraulic pressure on the brine circulating through the heater-tubes, and yet exhaust its steam into the steam-space of the heater, where it is utilized. This reduces the cost of running the pump to the loss of steam by condensation in its cylinders.

Attached to heater A or evaporator E at their lowest point is a cylindrical vessel, like the hot-well A'. It is provided with inlet and draw-off pipes, into which the impurities settle. We usually make evaporator E relatively large, and settle these impurities in the bottom of it, from whence they are drawn off from time to time by a pipe and valve, thus making the salt purer and better.

S is a steam-pipe from the steam-generator to heater A, to the pump I, and to the boiler-feeder; S', steam-pipe from evaporator E to heater B; $S^2$, steam-pipe from evaporator F to heater C; $S^4$, exhaust from pump I to heater A, it being branched on the steam-supply pipe to A, into which the exhaust from the boiler-feeder may also be conducted.

Heat and water pressure gages are placed on the apparatus, as shown, to secure the proper regulation and duty.

The brine-circulating pipes, which convey the brine from open evaporator to pump I, are marked P. P' is a pipe which conveys the brine from pump to heater C; $P^2$ from heater C to heater B; $P^3$ from heater B to heater A; $P^4$ from heater A to closed evaporator E; $P^5$ from E to F; $P^6$ from F to G; $P^7$ from G to H.

$P^8$ is the fresh incoming brine supply, attached to pump-suction P after passing heater D.

Pipes $P^4$ and $P^5$ are each furnished with stop-cocks or weighted spring-valves. Their purpose is to regulate the hydraulic pressure on the brine.

Suitable valves are provided to regulate the proper action of the apparatus. They are marked $v'$, $v^2$, $v^3$, $v^4$, &c.

In Fig. 3 is shown a conical or sloping bottom vessel provided with a screw at its lowest point, driven by a spur and gear from the outside, as shown. The screw passes the salt, as shown, into a compartment below its level, and from which it may be raked or drawn down and left to drain; or it may be treated in an ordinary sugar centrifugal and then dried; or it may be dried in the centrifugal and further drying dispensed with. It may also be washed in it for the purpose of removing impurities.

Salt will be deposited in the open grainers G H, of the ordinary grades, in the usual manner.

To make fine salt we place in the brine in the grainer, just under its surface, a longitudinal strip or shaft of wood, properly supported, provided with arms or slats of wood one inch thick, three inches wide, and four feet long, so that in a twelve-foot grainer three of these shafts, side by side, when moved twelve inches—that is, by a six-inch crank motion—will completely agitate every part of the surface of the brine. A rapid movement will make the salt very fine, and by graduating the rapidity of the movement in any suitable manner the salt can be made of any desired fineness. As before stated, smaller grainers will suffice for this work, as the evaporation is much more rapid when the heated brine is thus agitated.

Fig. 3 shows the screw K, the outside gear L, the depressed receptacle R, the agitating-shaft M, cross-pieces N, driving-gear O, and motion-changers X X. When using the ordinary flat-bottom grainer, salt can be taken out and the process go on without interruption, there being no heating-surfaces to be cleaned from incrustations.

To operate the apparatus, fill the open grainers to level of center of closed evaporator F, and start the pump. It takes brine from grainer H through pipe P, forces it through heaters C, B, and A, through pipes P' $P^2$ $P^3$, then into $P^4$, lifting the weighted valve which has been set at sixty pounds pressure, and into evaporator E. From E it will flow through $P^5$ into F, thence into H, through H into pump-suction P, and so on, as before in a continuous circulation. In the open grainers the circulation is distributed along one end, and so as to compel a circulation in the direction of their length, and the pump suction-pipe is arranged to prevent any salt flowing into it. The circulation goes through G by a head-pipe at its end and returns through H. It is evident one grainer with a division in it, or any number of grainers in connection, would be equivalent. The pump I and the boiler-feeder exhaust steam into heater A, in which a pressure of fifty pounds steam is carried around the tubes. Steam will be condensed and its place supplied from the boiler and pump. Brine is heated to 300° Fahrenheit, and is passed into evaporator E, where it loses a portion of its heat and pressure—about 40° of the former and forty-five pounds of the latter, a pressure of fifteen pounds to the square inch being maintained in the evaporator. A portion of the brine is evaporated, producing steam of the tension and heat of 260°. The brine now flows into evaporator F, where it loses another portion of its heat, about 31°, and the pressure is reduced to atmospheric tension. Steam is produced at 212°. The brine flows into open grainer at 229° and rapidly evaporates, losing heat down to 170°, (130° if desired and grainer sufficiently large,) depositing all the salt it cannot carry at that heat and the point of concentration, and passes through G and H to the pump to be circulated as before. Now the steam in evaporator E passes by pipe S' into heater B under fifteen pounds pressure and about 255° of heat, and is condensed continuously. At the same time the steam from evaporator F rises in pipe S, passes into heater C at about 212°, and is condensed continuously. The heat thus taken out by the evaporation in E and F and latent in its steam is made sensible by being condensed in the heaters and heating the brine flowing through them continuously. The brine comes from grainer H at 170°, passes pump P into heater C, where it is heated in its passage to 212°. Then into B at that heat, and out of it at 250°, leaving but 50° to be made up by the steam in the boiler applied to heater A. Total range of heat being, in heater A, 300°, grainer, 170= 130° difference utilized at each operation. Thus the brine is passed continuously through a series of descending heat steps from A to H, losing its heat from 300° to 170° in the evaporators, and by means of the steam (water) evaporated; and also passed through a series of ascending heat steps from H, 170°, to A, 300°, gaining in it passage through each heater an ascending range of heat by the utilization of the steam evaporated in closed evaporators E and F. No deposits of salt or other crystalline matters can take place in the heaters, because no evaporation is permitted. Steam of fifty pounds pressure and hydraulic pressure of sixty pounds it is impossible to evaporate in the heaters; hence no deposits can occur. The action is also assisted by use of the process described of drawing off impurities. There will be no deposits of salt in E and F, because the brine, by being highly heated, increases its capacity for salt, and can lose considerable water without making salt. It is obvious more heat effects might be obtained with more evaporators and heaters in the circuit, using the same range of total degrees of heat difference; but with the same evaporators and greater degrees of heat difference in them salt would be deposited.

Various modifications of this apparatus may be made. Thus the heaters B and C and evaporators E F may be dispensed with, and the highly-heated brine from heater A sent through pipe P⁴ and valve V' and discharged directly into the grainers above or below their surface, depositing salt, cooling the brine, and returning it again by means of the pump and connections. Continuously all the heat imparted in A will be utilized in producing vapor in the grainer, the same as if the pipes were immersed in the brine in it, with the advantages of clean heating-surfaces, and a continuous operation, not impeded for removing salt or incrustations. Our agitators in the grainers for making fine salt may be used in this modification. It may also be used as a vacuum apparatus. If as a triple effect, an additional closed evaporator will be needed in place of G H, and an additional heater, the steam from last evaporator to be condensed as usual and vacuum maintained by a pump or otherwise. In boiling salt or substances not affected by high heat the initial steam and hydraulic pressures may be high, while for other substances it may be at atmospheric tension or lower at the initial, a vacuum being carried in the evaporators of different degrees of tension to produce the necessary degrees or steps of heat downward to about 130°, and upward by steps, as before.

Whatever system is adopted the hydraulic pressure on the brine in the heaters should be just enough to overbalance the tension of vapor that would be made by the steam-pressure employed in the first heater.

If salt be made in a vacuum, we provide an outlet from the evaporator consisting of a leg attached to its bottom of suitable size and provided with two valves, so that the upper one being open and the lower one closed, the salt will fall into the leg. Then by closing the upper valve and opening the lower one the salt will drop out. Fig. 3 shows a similar leg attached to one of our fine-salt grainers. It may be filled with brine or steam before opening upper valve to be refilled.

The advantage of gradually reducing the temperature of the brine is as follows: If but one closed evaporator were used in the circuit, the brine would flow from heater A into it at 300° and at atmospheric pressure. The vapor arising would be at 212° heat, and though in large quantity could not pass into heater B and heat the brine in it any hotter than 212°. Now, by keeping the heat up in E the intensity of heat in the vapor arising is utilized by the accession of 40° heat to the brine in B, thus reducing the amount wanted from the boiler. The saving of fuel is fully one-half of that required by the usual methods. Only one-half the surface being needed in the grainers and they being kept up to full evaporative duty very materially reduces the loss by radiation.

All the pipes, heaters, evaporators, (closed,) and pumps are covered to prevent radiation. To operate our fine salt process will also cost much less than the usual method of drying, grinding, sifting, &c., besides the grain produced is more uniform, each grain being a separate and perfect crystal, while by the ordinary processes they are irregular and opaque, having been made from solid crystals broken up and crushed in the grinding. The crystals, being brilliant, make a fine sparkling table-salt.

In Fig. 4 is shown an end view of the conical bottom grainer, G, the depressed receptacle R into which the salt as it deposits is sent by the screw. At the bottom of the depressed receptacle is placed a screw elevating apparatus, 1, which elevates the wet salt into a mixer, 2, from which it passes into a centrifugal, 3, in which it is deprived of a large portion of its brine. From the centrifugal it passes into a hopper, 4, which passes the salt into a screw, 5, which extends through a steam-inclosed pipe, 6, by which it is finally dried. The drier may be of sufficient length to dry the salt at one operation, or it may pass consecutively through several tubes, or the salt may be dried in any suitable manner. From the drier the salt passes into an elevator, 7, into a storehopper, 8, from whence it may be taken for shipment.

Heretofore in the manufacture of fine table or dairy salt it has been impossible to make it directly in the bailing apparatus when kettles, pans, or grainers are used, because it adheres to the heating or evaporating surfaces when the boiling is so rapid as to cause an active agitation. It also forms on the heating-surfaces a scale or pan scratch. The salt thus made is known as "mush salt," which will not drain by standing, as ordinary salt does. This arises from the capillary attraction among the fine crystals being so great as to prevent the brine from running out. If kept standing for months, it will only dry and incrust on the outside of the mass, while inside it will be full of brine. For these reasons, in the ordinary processes of salt-making, the formation of such mushy salt is avoided as objectionable. In making our finest grades of salt our apparatus makes the salt into such mush salt. It is then removed from the grainers by the screw or leg or pump, as shown in the drawings, and then finally separated from the brine in the centrifugal, as described, which leaves the salt in proper condition for further manipulation.

Sheet 5 of the drawings represents a modification of the apparatus adapted to the purification of the salt by extracting therefrom in crystalline form the brine salts continuously without in any manner interfering with the operation of the apparatus. An additional tubular steam-heated heater is placed in connection, and all the heaters otherwise arranged and constructed as before described are provided with movable heads or covers, to be easily opened by removing a crab and bolt, or a set of eyebolts, which expose the inner surfaces of the heaters to be cleaned, either by a rapid current of water or by a rod. The pipes, connections, &c., to the heater are fitted into the prolonged sides of the heater, so that the heads or covers may be removed without breaking joints or disturbing the connections for brine or steam supply. Suppose heater A to be in use in connection with B and C, the closed evaporator, open grainer, pump, pipes, &c., as before described. Then after running with steam of about 300° heat for twelve to twenty-four hours the currents of steam and brine passing through it are cut off, and at the same time changed into the heater $A^2$ by means of the three-way cocks $V^8$ $V^9$ $V^{10}$. Heater A is now opened, and its tubes will be found coated with hydrous crystals of sulphate and carbonate of lime in a sandy or porous condition, in which shape they will not impair the heating-power of tubes, and the action might be continued until the tubes were filled up. We prefer, however, to open the heater at stated periods and clean out the deposits. This method we employ when treating brine which contains a large amount of sulphate and carbonate of lime, or both, in solution. The deposits in a sandy condition, when heated under hydraulic pressure without evaporation or elimination of free gas, take place at from 200° to 300°, and as we operate our heaters at the latter heat all lime is deposited out of the brine. This result is shown by analysis to be one-fourth of one per cent. in salt so purified as against one and one-fourth per cent. made from the same brine in the usual way. This sandy and hydrous deposit must be distinguished from the deposit of the lime impurities in an anhydrous condition upon the heating-surfaces of the ordinary fire or steam heated salt-evaporators, which greatly impair their action requiring frequent cleaning by hammering or chiseling and causing great loss of fuel by reason of their non-conducting properties. After the heater $A^2$ has been operated a proper time the three-way valves are again changed, and it is cut off from the currents, while at the same time heater A, with clean tubes and closed head, is put into the circuit as before. Thus while the lime deposits are being withdrawn from the salt and from the apparatus no interruption of the process takes place and clean surfaces are continually provided for the heating. The deposition of the lime impurities in the heaters depends somewhat on the extent of the surface exposed as to heat the brine to a proper point with a moderate circulation through the tubes.

We are aware that saline solutions have been evaporated by heating them in a closed boiler heated by the direct application of fire to it, and subsequently evaporated in open vats; and we are also aware that saline solutions have been evaporated by heating them in tubular steam-heaters, conveying them into closed evaporators, and circulating them through closed conductors in a continuous current. We are, however, not aware that saline solutions have been heated in tubular steam-heated heaters and then evaporated in open vats; nor are we aware that they have been heated in tubular steam-heaters passed into closed evaporators and evaporated in open vats.

We claim—

1. The herein-described process of making salt, which consists of the successive steps in combination, as follows: first, circulating the brine under treatment in a continuous current through a series of steam-heated heaters under hydraulic pressure, then into and through a series of closed evaporators, then into and through an open grainer exposed to the atmosphere, and then again flowing it from the grainer through the system, for the purpose described.

2. The herein-described continuous process of making salt, which consists of the successive steps in combination, as follows: first, heating the brine in tubular steam-heated heaters under hydraulic pressure; second, partly evaporating it in closed evaporators; third, partly evaporating it in open grainers exposed to the atmosphere; and, fourth, mechanically agitating the surface of the brine to cause the deposit of fine salt, the said steps co-operating in the manner as described.

3. The herein-described process of evaporating saline solutions, which consists of the cumulative heating of brine previously cooled by evaporation by steam of different and increasing ranges of temperature, produced in the evaporation from the brine passing through the closed evaporator, in the manner and for the purpose described.

4. The herein-described continuous process of evaporating saline solutions, which consists of heating brine in a closed heater under hydraulic pressure, then conducting it into a closed evaporator in which a pressure above the atmosphere is maintained, and in which a portion of its heat is abstracted, then conducting it into a closed evaporator in which atmospheric pressure is maintained and heat relatively is abstracted, and then conducting it into an open grainer, in which its final loss of heat and tension of vapor below atmospheric pressure is reached, and from which it is again and continuously circulated through the entire apparatus, in the manner and for the purpose described.

5. The herein-described process of evaporating saline solutions, which consists in heating the brine in closed heaters under pressure, then abstracting the sensible heat from it by evaporation in successive steps of reducing ranges of temperature, for the purpose of heating the cooled brine in successive steps of increasing temperatures produced by condensation of the steam arising from the evaporating brine, which is continuously circulated through the entire apparatus, as described.

6. The process of making salt from brine, which consists of heating the brine in tubular heaters under pressure without evaporation, then partly evaporating it in a closed evaporator, and then drawing off the impurities, in the manner and for the purpose described.

7. The process of making salt from brine, which consists of heating the brine in tubular heaters without evaporation, then draining off the impurities, and then evaporating in an open grainer or evaporator and returning in a continuous current to the heater, as described.

8. In the manufacture of fine salt from brine, the process of regulating the size of the salt crystals, which consists in mechanically agitating the surface of the brine in an open grainer without the application of heated surfaces therein, said agitation being relatively different in different parts, and proportioned to heat of the brine therein, as described.

9. In the manufacture of pure fine salt from brine, the process herein described, which consists of depurating the salt by abstracting its impurities, then discharging it into an open evaporator in a heated condition, and then agitating it for the purpose of depositing the salt in minute crystals, as described.

10. In the manufacture of salt from brine, the process herein described, which consists of heating the brine in tubular heaters, then evaporating it in closed evaporators, then evaporating it in an open grainer, to the surface of which mechanical agitation is applied, in the manner and for the purpose described.

11. In the manufacture of salt from brine, the process herein described, which consists of circulating the brine through a tubular heater under hydraulic pressure, in which it is heated without evaporation, and in which its lime salts are deposited in a sandy condition, and then evaporating in an open grainer, as described.

12. The combination of the tubular heater A and the closed evaporator E with the open grainer F, in the manner and for the purpose described.

13. The combination of the heaters A B C with evaporators E F and grainers G H, in the manner and for the purpose described.

14. The combination of the tubular steam-heated heater A with pump I and open evaporator G, in the manner and for the purpose described.

15. The combination of the heaters A B C with evaporators E F, open grainers G H, and pump I, in the manner and for the purpose described.

16. The combination of the open grainer G with the agitators M M and the driving mechanism Q Q, in the manner and for the purpose described.

17. The combination of the tubular steam-heated heater A with the heater $A^2$, provided with connecting-pipes and regulating-valves, for the purpose of purifying the brine, as described.

18. The combination of the tubular steam-heater A, pump I, and open grainer G with the agitators therein, co-operating in the manner and for the purpose described.

19. In the manufacture of salt from brine, the process herein described, which consists of mechanically agitating the surface of the heated brine to form minute salt crystals, then abstracting the salt from the evaporating-vessel, and then separating it from the brine by centrifugal force, as described.

20. In the manufacture of salt from brine, the process herein described of purifying the brine by separating from it the sulphate and carbonate of lime held in solution by heating it to such a temperature (about 300°) as to deposit them, while under hydraulic pressure, on the tubes of the steam-heater in a hydrous condition, and then abstracting the deposits from the heater, in the manner and for the purpose described.

HORACE WILLIAMS.
JOHN L. ALBERGER.
LOUIS R. ALBERGER.

Witnesses:
CHRISTIAN STURM,
NICHOLAS MEYERS.